Sept. 26, 1950 J. C. NICHOLSON 2,523,966
PROCESS AND APPARATUS FOR MANUFACTURING
MULTIPLY SHEET MATERIAL
Filed June 28, 1945 2 Sheets-Sheet 1

Inventor
J. C. Nicholson

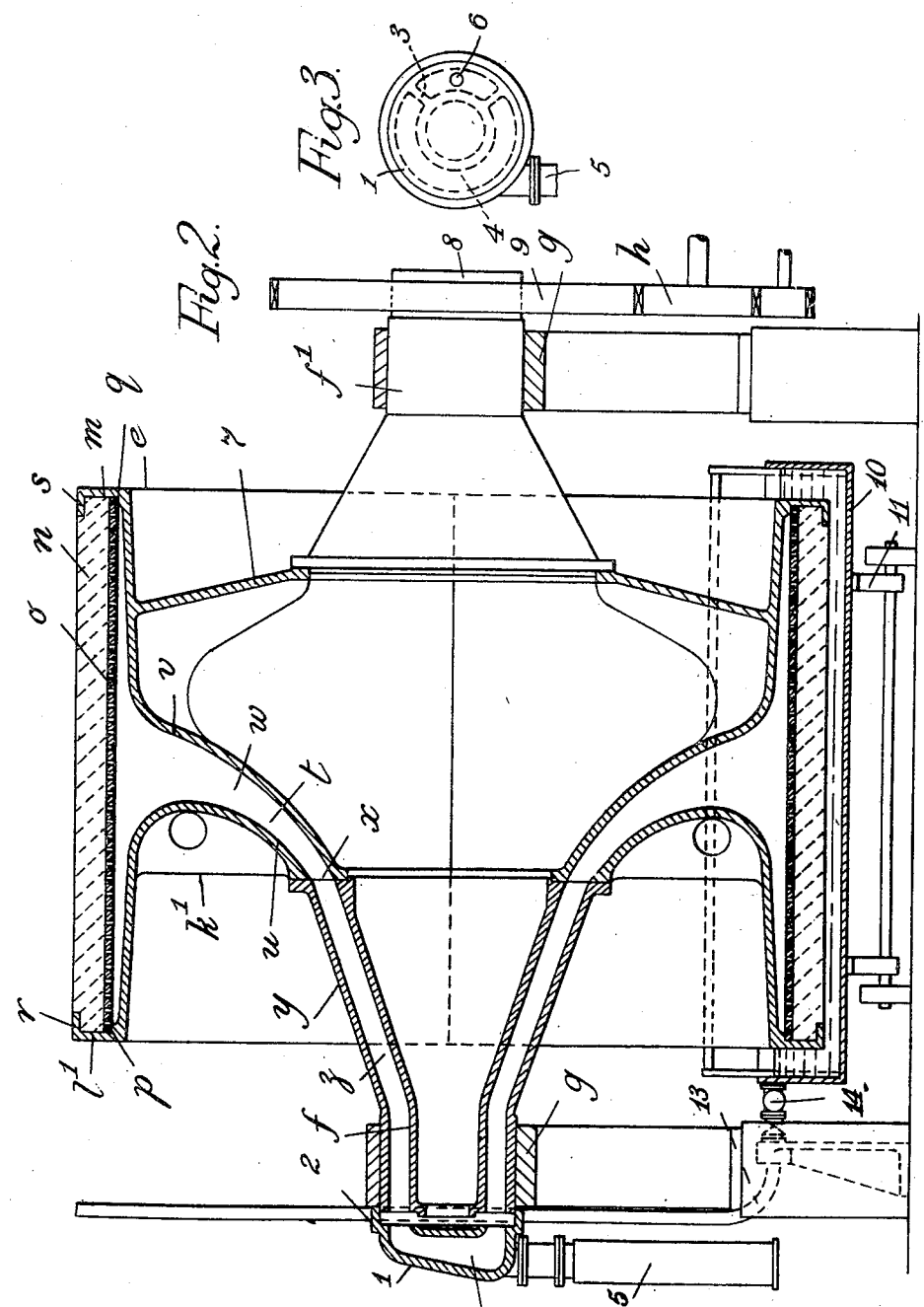

Patented Sept. 26, 1950

2,523,966

UNITED STATES PATENT OFFICE 2,523,966

PROCESS AND APPARATUS FOR MANUFACTURING MULTIPLY SHEET MATERIAL

John Coleman Nicholson, London, England, assignor to British Artificial Resin Company Limited, London, England Application June 28, 1945, Serial No. 602,108
In Great Britain June 25, 1943

Section 1, Public Law 690, August 8, 1946
Patent expires June 25, 1963

3 Claims. (Cl. 154—37)

This invention relates to the manufacture of composite or multi-ply impregnated or coated, or impregnated and coated, web or sheet material and to the moulding of articles from such web or sheet material.

The object of the present invention is to provide an improved material of the above character and an improved method and means for manufacturing such, an aim of the invention being to afford a continuous process of production of the web or sheeting which lends itself to the mass production of multi-ply webs, while affording a considerable variety in the constituent layers, or in other words the improved process or plant is capable of employment for the alternative or selective manufacture of composite multi-ply web material comprising layers (including a facing layer or layers) of different or various characteristics or qualities both as regards the base or core material and the material with which such is impregnated or coated.

The invention consists in a process of manufacturing multi-ply sheet material as indicated in the preceding paragraph comprising passing preformed webs of base or core material individually over or around one of a set of superposed pervious drums immersed in an aqueous dispersion of plastic material for impregnating or depositing on the base or core material such plastic material under vacuum conditions created within the drums, leading the treated webs together into superimposition between a plurality of pairs of pressure rolls and subjecting the layers to pressure and heat.

The invention also includes a process comprising partially curing the multi-ply material in the rolling step and subsequently passing such to moulds either as severed sheets or as a continuous web (or webs) and completing the curing operation after moulding.

The moulding may be effected by recessed or female moulds by the aid of air pressure operating as the pressing agent in association with the moulds, or where the web material is continuously moulded by the employment of mould counterpart rollers for the production of channel-like shapes.

The base or core material may be woven fabric or a felted material of animal or vegetable fibres such as wool, cotton, ramie or the like, mineral fibres such as asbestos or glass filaments, employed separately or in combination. Each or certain of the webs may have a base or core of a fabric or felt composed of one class of material or such may combine two or more materials, for instance wool and cotton, wool and glass or cotton and glass may be combined in the weaving yarn, or the different threads may be interwoven or the various fibres may be felted together. The web material or certain of the webs may comprise a base or core of wood veneer or pervious composition or they may comprise powdered or granulated material or disintegrated or unfabricated chips or fibres such, for example, as cotton and wool waste, wool and sawdust, jute and linen waste mixed with wool and/or sawdust, treated with calcium hydrosulphide or other material adapted to improve extensibility or the tensile quality, the base or core webs being produced by compression, felting or extrusion.

The web material or sheets may be plain or imperforate, or such may be perforated, or it may be roughened or have a teasled surface.

The composite multi-ply webs may also comprise a sheet metal web (or webs) or plate (or plates) or a thin sheet gauze metal layer (or layers) of any chosen metal sandwiched between the other layers referred to above. Where continuous sheet metal webs are employed, which are impervious, these may be perforated or shot blasted or pickled and uncoated and led between the rolls independently of the drum impregnating plant or they may be coated in any known way before being led into position between the rolls. The sheet metal or guaze web may be applied internally of the composite structure or externally as facing surfaces and may be plain, crinkled, embossed, ribbed or corrugated.

In carrying the invention into effect as described by way of example, plant comprising a set of pervious drums operating in immersion baths according to British Patent specification No. 551,179 may be supported in framework in superimposition, so that the treated webs may be led off from one side of the plant and conveniently brought together. At a suitable position intermediate the levels of the outer drums of the set and suitably spaced therefrom a roller pressing apparatus is installed. This comprises a series of pairs of rolls, each pair of which are adjustable as to the nip or clearance between the rolls, so that the clearance between the rolls of each pair is progressively diminished in the direction of travel of the material therethrough. One or both of the rolls may be heated to effect a curing or partial curing of the material passing therethrough. The treated webs as they pass severally from the drums may be passed over or through means adapted to remove excess coating material, and may be supported on suitable guide rollers in their passage to the pressure rollers where they are brought together under pressure to constitute a unitary multi-ply web.

The multi-ply web after pressure and curing is continuously passed to a cutting machine of known type adapted to cut or shear the web into sheets of adjustable predetermined size. After severing the sheets are collected and stacked for storage or further treatment. Alternatively where it is intended to operate on the sheets for the purpose of providing moulded forms thereon or to produce moulded articles therefrom the curing process between the heated rollers is only partially carried out and the severed sheets are then passed to a pressing plant comprising female or recessed moulds of the required characteristics in conjunction with which boxes or frames are used to which compressed air is supplied for acting as the pressing agent in association with the moulds.

The process and plant lends itself to a continuous moulding operation of certain forms. For example the webs may be passed between female or channel rollers and male or convex for the production of continuously corrugated webs or a continuous concave or convex form, or a similar moulding operation may be carried out upon webs adapted subsequently to be slit or cut longitudinally to sever each moulded or corrugated section from that laterally adjacent in order to produce channel-shaped members or convex or concave articles. If desired, the slitting operation may be effected prior to the passage of the webs to the moulding rolls, and in lieu of the female rollers concave or convex mould forms may be used in conjunction with suitable pressure applying means.

Tubes or pipes may also be formed either from partially cured channel forms produced as above described by passage through tube or pipe forming dies or the webs may be passed through tube forming dies without the intermediate troughing or channel-forming operation. In each of the continuous moulding processes as above indicated and after the channelled webs or tubes have been produced such are then passed on to a final curing operation before or after which the continuous forms are severed into appropriate lengths.

Referring to the accompanying drawings, in which like references indicate like parts:

Figure 2 is a sectional elevation on line 2—2 of Figure 1, and

Figure 3 shows the stationary cut off valve by which the vacuum is put into communication with that section of the drum which is immersed in the aqueous suspension of the initial phenol-formaldehyde condensate.

Figure 1:
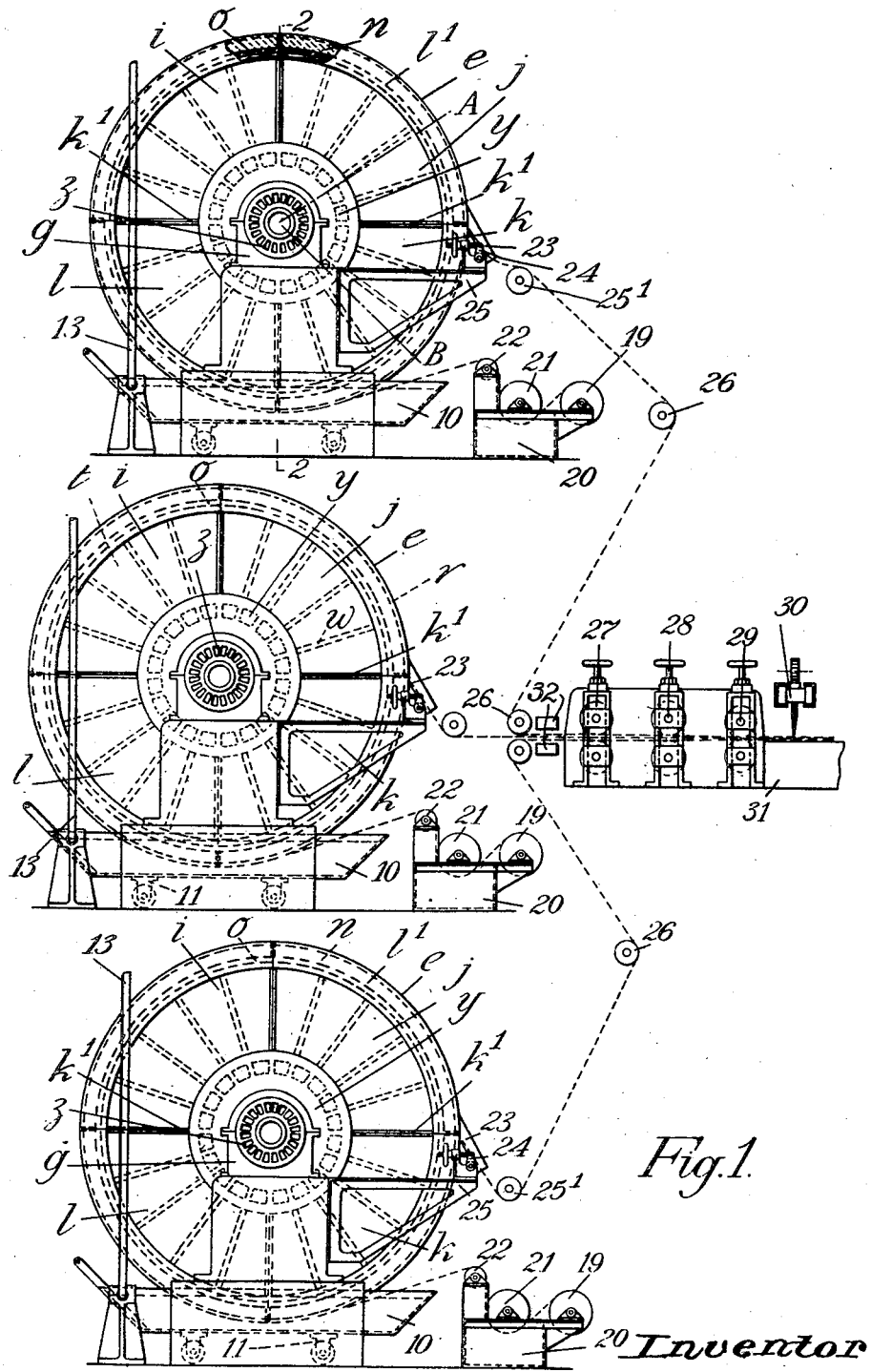
Figure 1 is a side elevation of an apparatus suitable for carrying the invention into effect in connection with the manufacture of a three ply material in which the plies of cotton fabric are united by means of phenol-formaldehyde resin.

In the drawings three identical drums $e$ are shown which are superimposed and are similar to that described in my British Patent No. 551,179, the top drum being shown partly in section.

The drums are supported by trunnions $f, f^1$ (Figure 2) in bearings $g$ for rotation about their axes, the drums being driven by a motor through gearing $h$ which drives them at a speed of substantially one seventh of a revolution per minute, the diameter of the drums shown being substantially four feet. The speed of rotation depends upon the diameter of the drums, proportionately lower speeds being employed with smaller diameters of drums. If desired the gearing may be change-speed gearing.

The drums $e$ comprise four quadrantal sections $i, j, k, l$, each of which is provided with a pair of flanges or webs $k^1$, for securing them together by means of bolts, not shown. The peripheral portion of each section is of channel shape in transverse section affording side flanges $l^1, m$, between which are located tiles $n$ of porous ceramic material providing a semi-permeable filtering body of cylindrical form, said material being hereinafter referred to as porous material. The tiles are supported on a perforated sheet metal cylinder $o$, which in turn is supported on shoulders $p, q$, and are held in position by ribs $r, s$ projecting inwardly from the flanges $l^1, m$. The tiles are cemented together along their longitudinal edges.

The inner surface of the perforated metal cylinder $o$ is spaced from the bottoms of the channels and the latter communicate at their central portion with inwardly and laterally extending ducts $t$, which are constituted by annular webs $u, v$, and radial partition $w$. The webs $u, v$, terminate at $x$ in a plane at right angles to the axes of the drums and have secured to them the hollow trunnion $f$ which has a frusto-conical extension $y$. Both the frusto-conical part and the trunnion $f$ have extending therethrough ports $z$ which communicate at their inner ends with the aforementioned ducts $t$. The end of the trunnion $f$ rotates within a recess 2 in a stationary cut-off valve box 1 which is provided with a dividing web 3 (Figure 3) affording two chambers one of which indicated at 4 is connected to a suction pipe 5 and the other to atmosphere through the port 6.

The other trunnion $f^1$ is secured by bolts, not shown, to an annular web 7 and extends into a bearing. A part 8 of the trunnion $f^1$ projects beyond the bearing and has secured thereto a gear wheel 9 through which the drums can be driven by gearing $h$.

Below the lower portion of the drum there is supported a trough 10 to contain an aqueous dispersion of cresol-formaldehyde condensate, the trough having a wheeled support or truck 11 so as to enable it to be readily wheeled and tilted into position. A pipe 13 is detachably connected to the trough whereby it can be supplied with a dispersion from an overhead supply tank. The supply is controlled by a valve 14 which can be operated by a float so that the level of the liquid in the trough is maintained constant. The lower portion of the drum is submerged in the liquid in the trough.

The chamber 4 (Figure 3) is connected through the pipe 5 to a vacuum producing apparatus.

The textile fabric to be treated is in the form of a roll 19 supported for rotation in bearings carried on the side of a tank 20 to contain liquid for wetting the fabric before it proceeds on to the drum for applying the coating. The path of progress of the textile material is shown in dotted lines and as will be seen from Figure 1 after the material has been wetted by passing under the roller 21 which depends into the wetting tank it passes over another roller 22 and then on to the drums. The material remains in contact with the drums through an angle of about 300° or any other suitable angle and the material is then stripped from the drum by a channel-shaped doctor knife 23 carried on a support 24 which is fixed on a bracket 25.

After removal of the material from the drums by the doctor knife 23 it passes over a roller 25¹ which supports the material as it comes from the drums after which it passes between guide rolls 26 and then between steam heated pairs of curing rolls 27, 28, 29 having gradually decreasing clearances between the rolls. These rolls are thermostatically controlled so that the curing temperature of 150° C. is maintained. This temperature will of course be varied in accordance with the thickness and type of resin employed. From the curing rolls the material passes beneath a cutting device 30, where the cured multi-ply sheet is cut into lengths of the desired size which fall on to the table 31. It is preferred to preheat the united plies before they enter the heated pressure rolls and such heating may be effected by the radio-frequency heaters 32. Such heating may also be effected between the sets of rolls. Any other means for effecting this auxiliary heating may be employed.

As will now be understood the rotation of the drums and the synchronously rotating rolls 19, 21, 22, 27, 29 will draw the textile material of the separate plies through the wetting tanks 20 from the supply rolls 19 and after passing over the rolls 22 it will come into contact with the porous tiles $n$ forming the cylindrical wall of the drums. During passage through the troughs 10 there will be applied by suction to the cylinders a coating of the condensate which will be applied to fill the interstices of the material. After passing out of the trough the coating will be partially dried by continuation of suction which will draw water through the pores of the tiles into the ducts $t$ and ports $z$. Liquid from the ports $z$ will be drawn into the vacuum tank through the connection 5 and the material will eventually be removed from the drums by the doctor knife 23. Further drying of the material and curing of the resin will take place during its passage through the heated pressure rolls 27, 28 and 29.

The angle through which each duct $t$ and its port $z$ are subjected to suction is indicated by the obtuse angle between the dot and dash lines A, B and the angle through which they are connected to atmosphere being the acute angle between these lines. It will be seen that the vacuum starts before entry into the liquid so as to avoid bubbles of air being drawn into the liquid.

The cresol-formaldehyde condensate dispersion may be prepared as follows:

A cresol-formaldehyde condensate containing sodium hydroxide catalyst and an excess of formaldehyde is partially reacted to form a viscous liquid. To this condensate is added 2% by weight of sulphonated ocenol (oleyl alcohol) which is stirred and dissolved at not more than 60° C. To this is added, slowly and with vigorous stirring, and in proportion of 60 parts of aqueous solution to 40 parts of condensate, a 3% solution of hard glue in water, the temperature meanwhile not exceeding 60° C.

If desired the sulphonated ocenol (oleyl alcohol) may be replaced by sodium stearate.

An emulsion of a thermoplastic resin which may be used containing methyl methacrylate may be prepared as follows:

100 parts by weight of monomethyl methacrylate containing 1 part of benzoyl peroxide is emulsified with 300 parts of water and 4 parts of sulphonated ocenol (oleyl alcohol), and the mixture is maintained at 70° C. while stirring in a closed vessel provided with a reflux condenser until polymerisation is complete.

It will be understood that other aqueous resinous dispersions may be employed instead of a cresol-formaldehyde condensate, the temperature of the curing rolls being modified to suit the particular condensate employed.

Examples of suitable condensates are urea-formaldehyde, polystyrene or polyvinyl resins or mixtures thereof.

An emulsifying solution suitable for all resins which are insoluble in water, but still soluble in alcoholic liquids, comprises the following in parts by weight:

10 parts casein
2 parts triethanolamine
4–5 parts ammonium hydroxide (spec. grav. 0.88)
4 parts lauryl sulphonate
12 parts water To 1,000 parts of this emulsifying agent are added 250 parts of any thermosetting or thermoplastic material dissolved in 250 parts of any suitable alcohol. The whole is then mixed in the usual way in an emulsifying apparatus.

Before the webs pass to the amalgamating or pressure rollers for making the composite or multi-ply web the outer surface of the web plies of the outer and/or inner webs may have deposited thereon by spraying or other known method a finishing layer of varnish, the composition of which is of the same family as the binder used for the impregnation of the base or core material.

The sprayed final finishing coat may be dried and cured in a heated chamber or by passing through a heated tunnel.

It will be appreciated that the plies of the composite web may be arranged in any predetermined order and where a particular waterproof finish is required the outermost layers of the composite web may comprise a base or core material embodying glass fibres. In some cases the inner plies may be of a very cheap variety operating mainly as a filler material of suitable strength. As an outer layer or finish the metal web material referred to above may be employed or the finishing layer may be wood veneer.

I claim:

1. A process of manufacturing multi-ply sheet material comprising passing preformed webs of pervious material individually about one of a set of pervious drums, dipping each web and drum into an aqueous dispersion of plastic bonding material for impregnating each web with said material, continuously applying vacuum to the webs from within the drums during and after dipping, the vacuum application during dipping effecting impregnation from surface to surface of the webs and the vacuum application after dipping removing substantially the whole of the water content of the dispersion of bonding material, leading the impregnated webs into superimposition, passing the superimposed webs through a plurality of spaced pressure zones, progressively increasing pressure on the superimposed webs from zone to zone in the direction of travel of the webs therethrough, and subjecting the webs to heat simultaneously with the application of pressure thereto to produce a uniformly dense laminated sheet.

2. A process of manufacturing multi-ply sheet material comprising passing preformed webs of pervious material individually about one of a set of pervious drums, dipping each web and drum into an aqueous dispersion of thermo-setting plastic bonding material for impregnating each web with said material, continuously applying vacuum to the webs from within the drums during and after dipping, the vacuum application during dipping effecting impregnation from surface to surface of the webs and the vacuum application after dipping removing substantially the whole of the water content of the dispersion of bonding material, leading the impregnated webs into superimposition, passing the superimposed webs through a plurality of spaced pressure zones, progressively increasing pressure on the superimposed webs from zone to zone in the direction of travel of the webs therethrough, and simultaneously with the application of pressure subjecting the superimposed webs to heat of an order less than the curing temperature of the bonding material so that only partial curing is effected whereby a multi-ply sheet material adaptable for subsequent molding is obtained.

3. An apparatus of the character described comprising a plurality of rotary vacuum filter elements, means providing a plurality of aqueous impregnating baths of plastic bonding material respectively subjacent each filter element, means for rotating said elements to dip a portion thereof into said baths, means for applying a web of pervious material over each of said filters whereby the webs are dipped into the baths when the filter elements rotate, means for applying vacuum from within said filter elements during and after dipping whereby each web is impregnated from surface to surface, the vacuum application after dipping removing substantially the whole of the water content of the bonding material, a plurality of pairs of heated pressure rolls, means for superimposing the impregnated webs and feeding the superimposed webs through said rolls and the distance between the rolls of each pair of rolls progressively diminishing in the direction of travel of the superimposed webs whereby the same are subjected to progressively increased pressure while being heated.

JOHN COLEMAN NICHOLSON.

REFERENCES CITED

The following references are of record in the file of this patent:

UNITED STATES PATENTS

| Number | Name | Date |
|---|---|---|
| 1,019,406 | Baekeland | Mar. 5, 1912 |
| 1,303,753 | Wright | May 13, 1919 |
| 1,609,222 | Taylor | Nov. 30, 1926 |
| 1,845,775 | Zavertnik | Feb. 16, 1932 |
| 2,068,893 | Stuart | Jan. 26, 1937 |
| 2,218,373 | Alexander | Oct. 15, 1940 |
| 2,433,965 | Upson | Jan. 6, 1948 |

FOREIGN PATENTS

| Number | Country | Date |
|---|---|---|
| 551,179 | Great Britain | Feb. 11, 1943 |